No. 702,814. Patented June 17, 1902.
T. NEURAY.
OIL FILTER.
(Application filed Dec. 5, 1901.)
(No Model.)
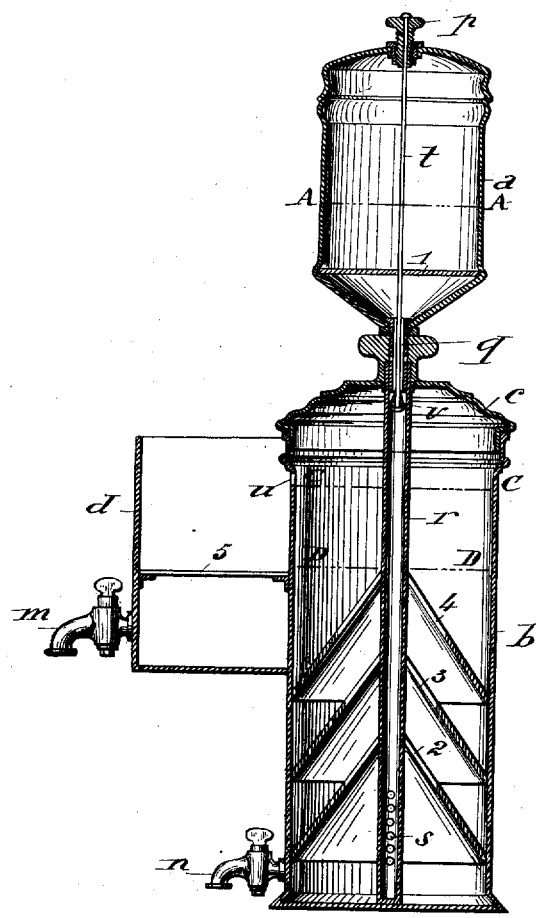

UNITED STATES PATENT OFFICE.

THOMAS NEURAY, OF LIÈGE, BELGIUM.

OIL-FILTER.

SPECIFICATION forming part of Letters Patent No. 702,814, dated June 17, 1902.

Application filed December 5, 1901. Serial No. 84,828. (No model.)

*To all whom it may concern:*

Be it known that I, THOMAS NEURAY, a subject of the King of Belgium, and a resident of Liège, Belgium, have invented a new and useful Oil-Filter, of which the following is a specification.

This invention has reference to an improved oil-filter; and the object of my invention is to enable oils which have been used for lubricating purposes to be thoroughly cleared of all foreign or injurious matter or materials which they may contain after being so used, this cleansing or clearing being effected without diminishing either the density or the lubricating quality of the oil. In order to attain this object, I employ a series of superposed and preferably cone-shaped filtering-sheets, made of textile fabric or material, a more and more closely woven material being used for each successive filtering-sheet. These sheets are submerged in hot water in such a manner that the oil being filtered must pass through the whole series before it reaches and floats on the surface of the water.

In the accompanying drawings, Figure 1 is a vertical sectional elevation of my improved oil-filter, and Fig. 2 shows three cone-shaped filtering-sheets in side elevation.

My improved oil-filter consists of a cylindrical vessel $b$, in which I provide a series—say three in number—of preferably cone-shaped filtering-sheets or equivalents 2 3 4, which are carried on metal or other cones and fit closely or tightly against the vessel $b$, a central tube $r$, which runs down through said filtering-sheets, serving, *inter alia*, to carry the cones.

On the top of the vessel $b$ is a reservoir $a$ to contain the oil to be filtered, which reservoir is in communication with the tube $r$ by means of a channel $q$, through which the oil from the reservoir $a$ flows down into the pipe $t$ and from the latter through apertures $s$ into the hot water contained in the vessel $b$. The oil next passes up through the filtering-sheets 2, 3, and 4 until it floats on the water, and when it has reached a sufficient height it will run out through an orifice $u$ in the vessel $b$ and into a receptacle $d$, provided with a draw-off cock $m$. The flow of the oil from $a$ into $b$ can be regulated by a valve $v$, carried by a valve-spindle $t$, which latter is connected to a regulating-screw $p$, so that by merely turning the screw $p$ the valve $v$ is moved up or down, as may be required and according to the viscosity of the oil. As shown in Fig. 1, I may provide the lower part of the reservoir $a$ with a filter 1 and the receptacle $d$ with a filter 5, if desired. The vessel $b$ contains hot water up to about the line D D and at a temperature of from 60° to 80° centigrade, and the filtered oil collects and floats on this until it overflows through the orifice $u$. The filtering-sheet 1 in the reservoir $a$ serves to remove the larger bodies of matter contained in the oil to be filtered, and the filtering-sheets 2, 3, and 4 are successively of finer mesh or made of more closely woven fabric, so that the oil is practically completely cleared of all such foreign bodies when it has passed through these. The flow of the oil through these filters 2, 3, and 4 is also accelerated by reason of its viscosity being to some extent reduced while passing through the hot water. The filtering-sheet 5, if employed, is intended to be of the finest mesh or made of the most closely woven fabric suitable for such purpose.

The vessel $b$ is provided with a cock $n$ to enable the water to be drawn off, if desired, or through which water may be introduced into the filter, and in order that the clearing or filtration of the oil may be practically perfect I prefer to fix the filtering-sheets 2, 3, and 4 tightly to the tube $r$ and to preferably also attach the latter to the cover $c$ of the vessel $b$.

Having now described my invention, what I claim as new, and desire to secure by Letters Patent, is—

1. In an oil-filter, the combination of a vessel $b$ adapted to contain hot water, an orifice $u$ near the top end of said vessel, a cover $c$ to close said vessel, a tube $r$ fixed to said cover and reaching down to about the bottom of the vessel, the lower end of said tube being formed with apertures $s$, and a series of superposed filtering-sheets of successively finer mesh fixed around said tube $r$ and fitting against the vessel $b$, all for the purposes and substantially as set forth.

2. In an oil-filter, the combination of a vessel $b$ adapted to contain hot water, an orifice $u$ near the top end of said vessel, a cover $c$ to close said vessel, a tube $r$ fixed to said cover and reaching down to about the bottom of the vessel, the lower end of said tube being formed with apertures $s$, a series of superposed filtering-sheets of successively finer mesh fixed around said tube $r$ and fitting against the vessel $b$, a reservoir $a$ mounted on the vessel $b$ and in communication by a channel $q$ with the tube $r$, a valve $v$, valve-spindle $t$, regulating-screw $p$, and a filtering-sheet 1 near the bottom of said reservoir, all for the purposes and substantially as set forth.

3. In an oil-filter, the combination of a vessel $b$ adapted to contain hot water, an orifice $u$ near the top end of said vessel, a cover $c$ to close said vessel, a tube $r$ fixed to said cover and reaching down to about the bottom of the vessel, the lower end of said tube being formed with apertures $s$, a series of superposed filtering-sheets of successively finer mesh fixed around said tube $r$ and fitting against the vessel $b$, a reservoir $a$ mounted on the vessel $b$ and in communication by a channel $q$ with the tube $r$, a valve $v$, valve-spindle $t$, regulating-screw $p$, a filtering-sheet 1 near the bottom of said reservoir, a receptacle $d$ on the side of the vessel $b$, a filtering-sheet 5 in said receptacle, and draw-off cocks $m$ and $n$, all for the purposes and substantially as set forth.

In testimony whereof I have hereunto set my hand in presence of two witnesses.

THOMAS NEURAY.

Witnesses:
O. S. NEY,
GREGORY PHELAN.